July 13, 1965 R. M. EISENBERG 3,194,869
SYSTEM FOR MEASURING THE ALTITUDE AND PROFILING
A THREE-DIMENSIONAL MAP
Filed April 25, 1963 3 Sheets-Sheet 1

July 13, 1965 R. M. EISENBERG 3,194,869
SYSTEM FOR MEASURING THE ALTITUDE AND PROFILING
A THREE-DIMENSIONAL MAP
Filed April 25, 1963 3 Sheets-Sheet 2
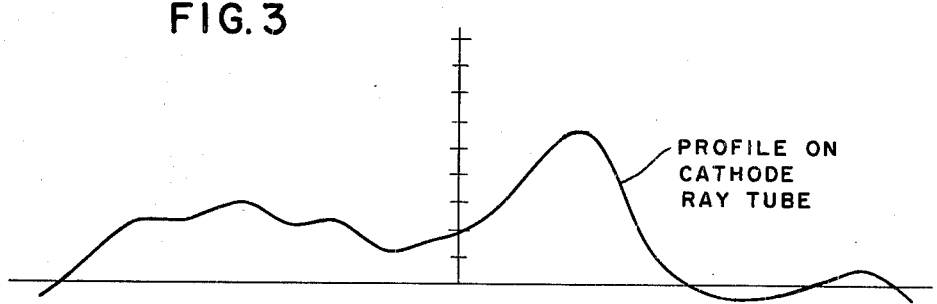
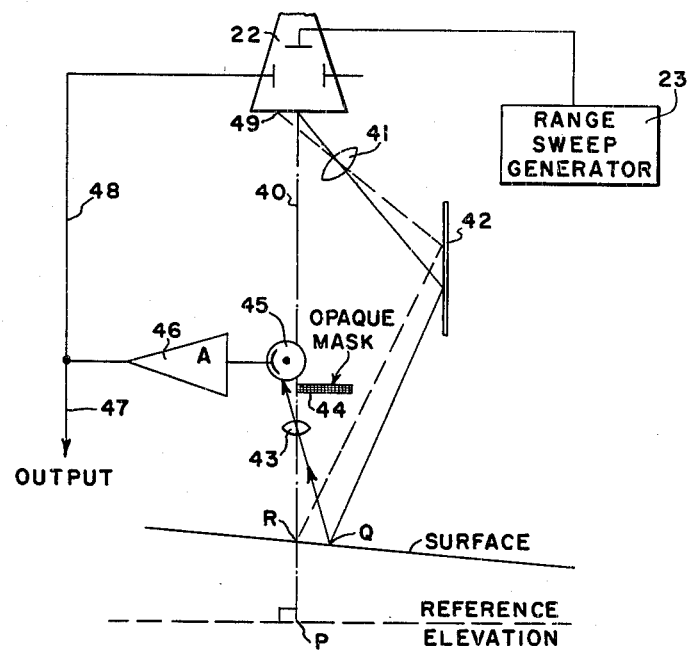

United States Patent Office 3,194,869
Patented July 13, 1965

3,194,869
SYSTEM FOR MEASURING THE ALTITUDE AND PROFILING A THREE-DIMENSIONAL MAP
Robert M. Eisenberg, Rockville, Md., assignor to ACF Industries, Incorporated, New York, N.Y., a corporation of New Jersey
Filed Apr. 25, 1963, Ser. No. 275,655
7 Claims. (Cl. 35—10.4)

The present invention relates to apparatus for use in simulators or the like for reproducing the profile of a three-dimensional map and obtaining measurements of the altitude along the profile, particularly for simulating corresponding radar measurements of ground terrain from an aircraft.

In the simulation of aircraft radar systems or radar altimeters by optical means, difficulties are encountered in measuring the altitude. These difficulties arise generally from the impossibility of determining the elevation by measuring the time of travel of a scanning light beam in a manner similar to that in which the time of travel to and from a target is measured in radar systems. A proposed system for solving this problem in simulators has been described in IRE Transactions on Military Electronics, vol. MIL-3, No. 3, July 1959—"Land Mass Radar Simulator," W.P. Jameson, R. M. Eisenberg. The system described in that paper measures the altitude by using an additional two-dimensional map which at each point has a reflectance or transparency proportional to the elevation. The present invention provides a system in which the altitude is derived from the three-dimensional terrain map itself thus obviating the need for an additional map.

An object of the present invention is to provide an optical system for deriving the altitude and/or drawing the profile of a three-dimensional map.

Another object of the invention is to derive altitude information from a three-dimensional map despite a possible occurrence of shadowing effects.

A further object of the invention is to reproduce the profile of a three-dimensional map and obtain elevation measurements therefrom substantially instantaneously without the need of an auxiliary map.

A still further object of the invention is to provide an improved optical system for simulating elevation measurements of aircraft radar or altimeter systems.

Other objects and advantages will become apparent and the invention will be fully understood from the following description and accompanying drawings wherein:

FIG. 3 is an oscillogram showing a profile obtained by the invention.

FIG. 4 is a schematic diagram of another embodiment of the invention.

Figure 1:
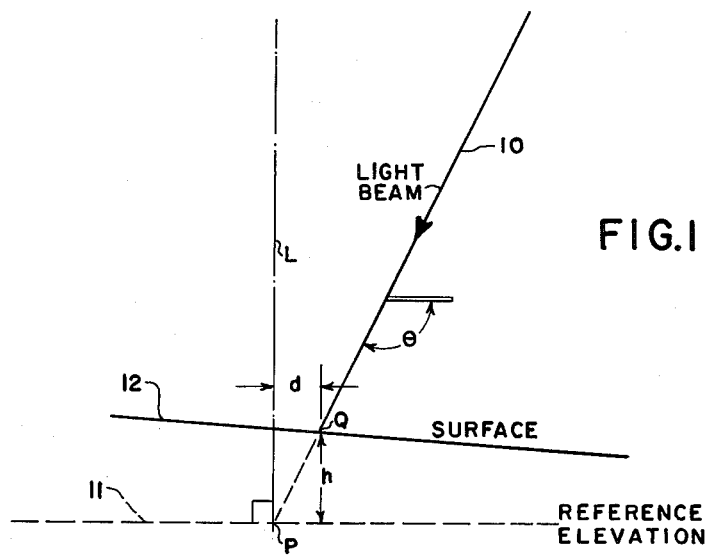
FIG. 1 is an explanatory diagram.

The diagram of FIG. 1 shows a light beam 10 directed at point P at a reference elevation 11, which may be sea level. The terrain elevation at the geographical point P may actually be that given by the intersection of the surface 12 of the map with the line L. The light beam will, therefore, strike the map surface at the point Q which has an elevation $h$ and a deviation $d$. It is evident that $h$ and $d$ are proportional and one is a measure of the other. If the angle of the light beam is made steep enough, elevation $h$ is substantially equal to that at point P. The invention accordingly derives a voltage substantially proportional to $d$ and thus measures elevation $h$.

Figure 2:
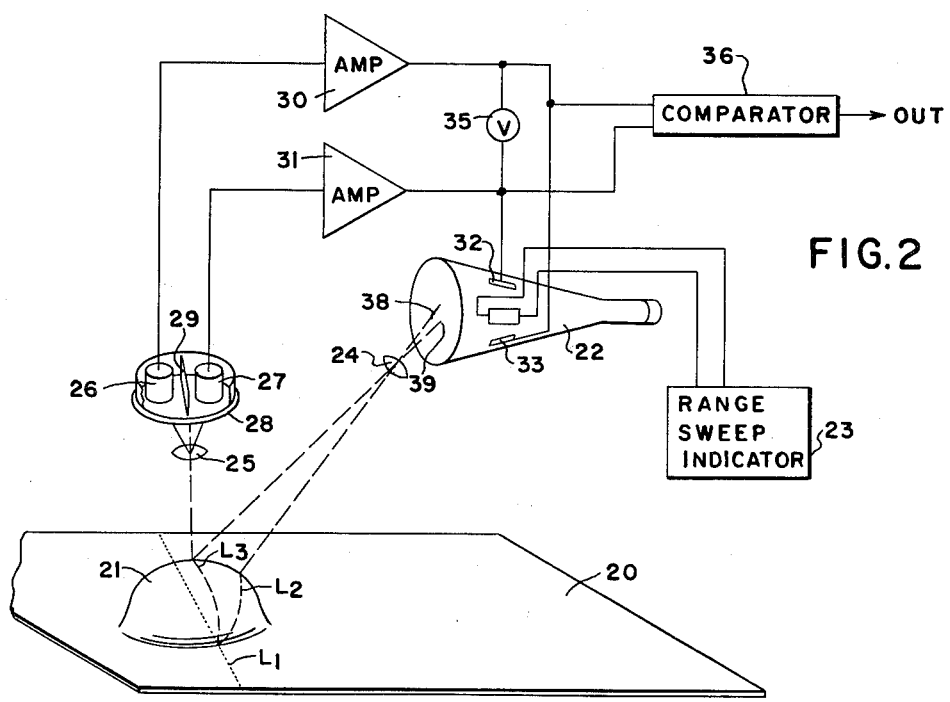
FIG. 2 is a schematic diagram of one embodiment of the invention.

In FIG. 2 map 20 is presumed to have an elevated surface 21. Cathode ray tube 22 is connected to range sweep generator 23, which impresses a sawtooth wave on the horizontal deflection plates of the cathode ray tube. These devices constitute a flying spot scanner which projects a spot of light through lens 24 onto the map. If there were no elevation, the flying spot would trace out the line $L_1$. In encountering elevated surface 21, however, the flying spot follows line $L_2$. The light reflected from line $L_2$ passes through a lens 25 and falls on photocell 26. Photocell 26 is mounted side by side with a photocell 27 in a housing 28 provided with an opaque divider 29 separating the two photocells. The outputs of the photocells are fed to amplifiers 30 and 31. These amplifiers are connected to the vertical deflection plates 32, 33 of cathode ray tube 22. A suitable voltage measuring instrument 35 may be connected across the outputs of the amplifiers for indicating their relative voltage outputs. The outputs of amplifiers 30 and 31 are also connected to a comparator 36 for comparing the outputs of the amplifiers and providing an output voltage which is a measure of the altitude. The voltages impressed on the vertical deflection plates 32 and 33 moves the electron beam from its initial position 38 to a position 39, causing the light ray projected by lens 24 to move from line $L_2$ toward line $L_3$. Light incident on line $L_3$ is reflected through lens 25 to fall mainly in the region of divider 29, with only minimum amount of light falling on photocells 26 and 27, which as shown in FIG. 2 are spaced equally from divider 29. If the ray of light should move from line $L_3$ toward $L_2$, it is evident that the reflected beam passing through lens 25 would move toward photocell 26 and away from photocell 27, so that a greater portion of the beam would fall on photocell 26 and a smaller portion, if any, would fall on photocell 27. The error voltage required to correct the deviation between $L_2$ and $L_3$ is substantially proportional to the altitude at each instant and at each point along the line $L_3$, thus the altitude is measured by the instrument 35 and is represented by the voltage output of comparator 36. Also, as the electron beam is swept across the face of cathode ray tube 22 it is deflected proportionally to the altitude so that it produces an oscillogram of the type shown in FIG. 3 representing the profile. The light producing and sensing elements 22, 24, 25 and 26–29 are mounted for movement along the map in simulation of the movement of an aircraft over the terrain.

In FIG. 4 cathode ray tube 22 is again connected to range sweep generator 23, as in FIG. 2. Normally the cathode ray tube produces a spot which is swept in a plane perpendicular to the paper and passing through center line 40. By means of lens 41 and vertical mirror 42, the light spot is projected toward a point P at the reference elevation, but the light ray may be actually intercepted at a point Q by the surface of the map. Another lens 43 has its axis coinciding with the center line 40 and an opaque mask 44 is placed so that it extends beyond the center line just slightly. Above the mask, photomultiplier tube 45 is located so that a reflection from point Q will strike its cathode, while a reflection from point R will be intercepted by the opaque mask. The photomultiplier 45 is connected to amplifier 46, which has an output 47 and a connection 48 to one of the vertical deflection plates of the cathode ray tube 22, (the connection of the other plate to a suitable potential point not being shown). When light from a point Q reaches photomultiplier 45, amplifier 46 produces an output voltage which deflects the spot on the cathode ray tube to the point 49 and the light ray shown in dashed lines from point 49 is moved very nearly to the point R from the point Q. This occurs when the output of amplifier 46 is just sufficient to produce the required deflection of the cathode ray tube electron beam to the point 49. As the beam is swept back and forth by the range sweep generator 23, the profile of the course traversed by the light ray on the map will be reproduced on the face of the cathode ray tube. At the same time the voltage on the output 47 will be an instantaneous measure of the altitude. In a radar or altimeter simulator the elements 22 and 41-45 will be moved along the map from right to left, say, to simulate the travel of an aircraft over the terrain represented by the map.

Figure 5:
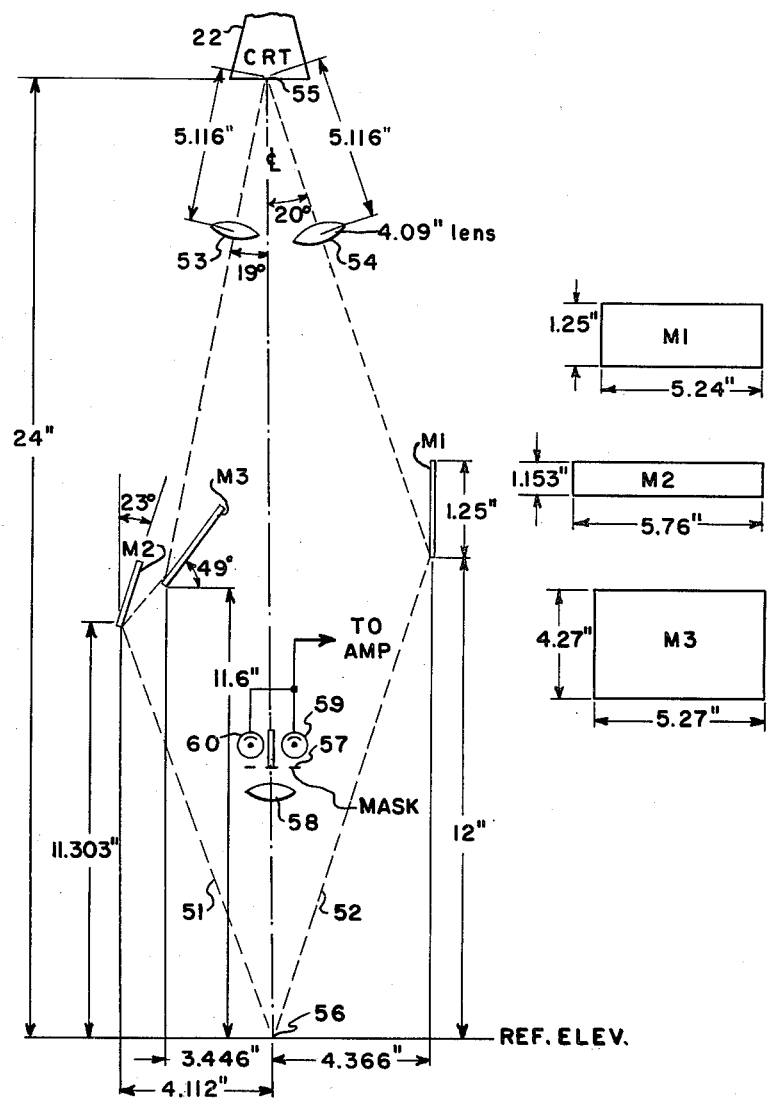
FIG. 5 is an embodiment of the invention utilizing two optical paths.

FIG. 5 shows a system of the type shown in FIG. 4 except that the light spot from cathode ray tube 22 is projected along two optical paths 51, 52. The purpose of the double optical path is to overcome shadowing effects which might occur at particularly steep places on the map. The system of FIG. 5 has the same electrical connections as that of FIG. 4 and, therefore, are not duplicated in FIG. 5. The two optical paths include lenses 53 and 54 and mirrors $M_1$, $M_2$ and $M_3$. The dimensions of mirrors $M_1$, $M_2$ and $M_3$ are shown on the right side of FIG. 5. The two light paths are arranged so that they have the same length from point 55 to point 56 and have the same inclination at point 56. Along the center line 55-56 there is placed lens 58 and a photocell device similar to 26-29 of FIG. 2 including opaque mask 57, and photomultiplier tubes 59, 60 having an output which is impressed on an amplifier corresponding to amplifier 46 of FIG. 4. It will be noted that point 56 is at the reference elevation. Light from the point 56 will not reach the phototubes but will be intersected by mask 57. When the map has an appreciable elevation, the light rays will be displaced from point 56, and the light reflected from the map will then pass through lens 58 and fall on phototube 59 or 60. The output of the phototubes when amplified will deflect the electron beam of cathode ray tube 22 in the manner already described with reference to FIG. 4. As a result the light rays 51 and 52 will be shifted to strike the map at points close to point 56. Even if one of the light rays should be shadowed by a very steep portion of the map, the other light ray will be positioned so as to cause the amplifier connected to phototube 59 or 60 to produce an output voltage substantially proportional to the elevation.

It has been found that light ray 52 can conveniently have an angle of about 70° to the horizontal and map elevations of about 3.6 inches can be measured. The cathode ray tube may be a Westinghouse WX4030 type and the photomultiplier may be 1P21. The amplifier 46 is a wide band high gain amplifier capable of at least 25 volt output. The equipment shown in FIG. 5 is mounted for movement along the map as described with reference to FIG. 4.

The scope of the invention is defined in the following claims.

What is claimed is:

1. Apparatus for determining the elevation of points on a three dimensional map, comprising means for projecting a ray of light toward given points having a zero altitude at an acute angle to the plane of the map, whereby the point of intersection of the ray of light with the map has a geographic deviation which varies with the elevation of said point, photoelectric means for receiving from the map an amount of light which varies with said deviation, means responsive to the photoelectric means for repositioning said ray of light so as to diminish said deviation, said last means providing an output which is a measure of the elevation at the point of intersection of the repositioned ray of light.

2. Apparatus according to claim 1, wherein said means for projecting said ray of light includes a cathode ray tube having deflecting means and a range sweep voltage generator connected to the deflecting means for sweeping the electron beam thereof.

3. Apparatus according to claim 2, wherein said photoelectric means includes a pair of spaced photocells and optical means in front of said photocells for causing said photocells to view areas on opposite sides of a given point.

4. Apparatus for determining the elevation of given points on a three dimensional map, comprising a flying spot generator movable over said map for projecting a ray of light onto said map at an acute angle to the plane of the map, whereby the point of intersection of the ray of light with the map has a geographic deviation from one of said given points which varies with the elevation of said point of intersection, photoelectric means movable with said flying spot generator so as to be located opposite said given points of the map for receiving from the map an amount of light which varies with said deviation, amplifier means responsive to the photoelectric means and connected to the flying spot generator for repositioning said ray of light so as to diminish said deviation, said amplifier means providing an output which is a measure of the elevation at the point of intersection of the repositioned ray of light.

5. Apparatus for determining the elevation of points on a three dimensional terrain map, comprising means for projecting two rays of light at a geographical point of said map from opposite sides of said point at acute angles to the plane of the map, whereby the points of intersection of the rays of light with the map have deviations from said geographic point which vary with the elevation of said point, photoelectric means for receiving from the map an amount of light which varies with said deviation, means responsive to the photoelectric means for repositioning said rays of light so as to diminish said deviations, said last means providing an output which is a measure of the elevation at the intersections on the map of the repositioned rays of light.

6. Apparatus according to claim 5, wherein said means for projecting said ray of light includes a cathode ray tube having deflecting means and a range sweep voltage generator connected to the deflecting means for sweeping the electron beam thereof, said cathode ray tube having a second deflecting means, said means for repositioning said rays including means for generating an error voltage and impressing said error voltage on said second deflecting means, whereby the cathode ray tube beam reproduces the profile of the map along the path transversed by said rays.

7. In an aircraft training simulator, apparatus for determining elevation comprising a three dimensional terrain map, cathode ray tube means for projecting a ray of light toward a desired map location at an acute angle to the plane of the map, whereby the point of intersection of the ray of light with the map has a deviation from the desired location which varies with the elevation of said point, photoelectric means positioned to receive a reflection of said ray from the map for producing error voltages dependent on the magnitude of said deviation, means for impressing said error voltages on said cathode ray tube means for deflecting the cathode ray tube electron beam and hence repositioning said ray of light so as to diminish said deviation, whereby the deflection of the electron beam is a measure of the elevation at the point of intersection of the repositioned ray of light.

References Cited by the Examiner
UNITED STATES PATENTS 2,645,971  7/53  Herbst _____ 250—217
2,868,993  1/59  Henry.
2,969,466  1/61  Morris _____ 250—217

OTHER REFERENCES

Pederson et al.: Proceedings of the National Electronics Conference, vol. 7, pages 216 to 227, Feb. 15, 1952 (TK-7801.N3).

Slattery et al.: IRE Transactions on Military Electronics MIL-3, No. 1, January 1959, pages 75 to 82 incl. (UG-485.15).

CHESTER L. JUSTUS, *Primary Examiner*.

MAYNARD R. WILBUR, *Examiner*.